Fig. 3

Patented May 20, 1941

2,242,241

UNITED STATES PATENT OFFICE 2,242,241

FRUIT TREATING APPARATUS

Mark Ewald, Olympia, Wash., assignor to Special Equipment Company, Portland, Oreg., a corporation of Oregon Application October 14, 1932, Serial No. 637,708
Renewed April 2, 1936

44 Claims. (Cl. 146—52)

This invention relates to fruit treating apparatus and more particularly to a device for cutting the central seed containing portion from the cut face of a half fruit.

Filed concurrently with this application for Letters Patent is my application for Letters Patent filed October 6, 1932, Serial Number 636,447, and entitled Pear treating apparatus. The latter mentioned application fully describes a machine for stemming, halving, peeling and coring pears in a manner to prepare them for canning. In said prior application Ser. No. 636,447 I have claimed the features of the general combination. In the present application I have claimed those features relating to the mechanism for removing the central seed containing section from the half fruit. The present device is an improvement over parts of the mechanism described in the concurrently filed application, above mentioned, and which performs the coring operation upon the fruit.

The present device includes improvements over anterior devices for removing the core or central seed containing portion from a fruit and which simplify the mechanical structure thereof as well as to provide a more expedient manner of handling the fruit. The present machine, in principle, is like the earlier devised machine.

It is an object of the present invention to provide an improved means for removing the core from a fruit.

Another object of the present invention is the provision of a fruit coring device which will treat half fruits of different sizes with an equal degree of efficiency.

Another object of my invention resides in providing a device for excising or removing the central seed containing section of a half fruit, wherein means is provided for firmly holding the half fruit in the fruit holder by contacting the exposed flat cut face of the fruit during the cutting operation in such a manner that the holding means is relieved from the holding of the fruit after the cutting operation and is then shifted to turn the cut half fruit in and relatively to the fruit holding means and bodily about an axis lying substantially parallel to the cut face of the half fruit, and preferably substantially adjacent thereto, and for so shifting the fruit in the fruit holder in order to discharge it therefrom, and/or for discharging the central seed carrying section of the fruit free of the half fruit.

Yet another object of the invention resides in providing mechanism for cutting the central seed containing portion of a half fruit, which mechanism not only serves to remove this seed containing section from the half fruit but also serves bodily to turn or shift the so cut half fruit in and relatively to its fruit holder to bring about the discharge of the cut half fruit from the fruit holder and/or the complete separation of the cut portion of the fruit from the half fruit.

Another object of the present invention is to provide a coring paddle and a coring spoon to be rotated in the same direction at different times.

Still another object of the present invention is the provision of a coring paddle and a coring spoon adapted to be operated in selected sequence from a single immediate spindle.

Another object of the present invention is a device for coring fruit while held in a fruit receptacle of a machine and to remove only the separated fruit from such receptacle.

The above named objects and other desirable objects are attained by the novel arrangement, unique combination and improved construction of the parts comprising the invention, one embodiment of which is illustrated and described, the various parts of which are fully set forth in the following description which is to be taken in connection with the accompanying drawings hereby made a part of this specification and in which:

Like reference characters are used throughout the drawings and in the following description for designating similar parts of the device.

While I have shown my improved mechanism in connection with the type of machine described in my application Serial No. 636,447, it is to be understood that the present invention is of general application and may be utilized in other types of machines. Furthermore, it will be apparent that the specific mechanism herein disclosed for removing the central seed containing portion, forming the subject matter of the present invention, differs in its construction and operation from that of my prior application Serial No. 636,447. The present invention, in some respects, is an improvement upon, and in other respects a departure from the subject matter of my prior application Serial No. 614,062, filed May 28, 1932, and differs therefrom in that such prior application Serial No. 614,062 discloses, in part, the mechanism for removing the central seed carrying portion and the so-called paddle mechanism or fruit contacting and inverting mechanism revolving simultaneously in opposite directions about its substantially common axis; and also in the fact that the so-called paddle mechanism is imperforate so that the central seed containing section is necessarily retained and is discharged with the half fruit from the fruit holder in a separate movement of the cutting mechanism and the so-called paddle mechanism, whereas, in respect to this feature of the invention in the present case, the fruit inverting and contacting mechanism is constructed and arranged in association with the central seed containing excising mechanism to permit such seed containing portion to be discharged free of the half fruit into the fruit holder or therethrough, so as to eliminate the necessity of discharging the seed containing portion with the completely processed half fruit or by means of a separate scavenging movement.

In addition, the present invention includes a number of other features of novelty over my prior application Serial No. 614,062, such features relating to the lifting of the fruit contacting mechanism or paddle adhesion thereto to lift the cut fruit to permit a more efficient turning of the half fruit; details of construction of the shifting and turning mechanism of the cutting means and the fruit contacting means; the means for kicking or ejecting the half fruit from the fruit contacting mechanism; and the many details of construction of the frictional driving means between the alternately reversing, rotating shaft and the paddle and cutting mechanism.

In the present invention the cutting mechanism for removing the central seed containing portion of the half fruit is capable of many variations, and is not to be limited to the exact disclosure of said cutting mechanism, it being understood that any type of cutting mechanism for accomplishing this function may be utilized within the scope of the appended claims.

Figures 1, 13:
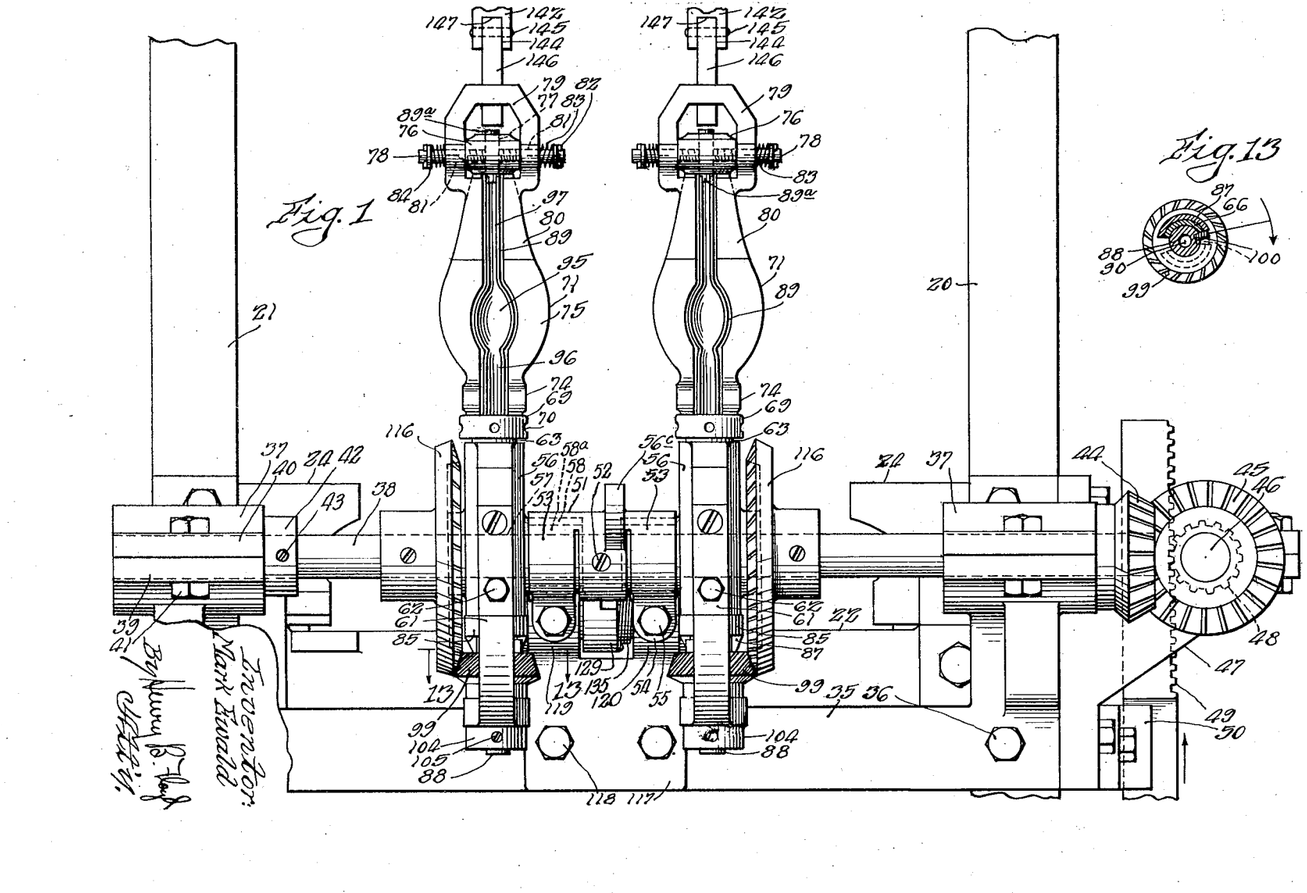
Figure 1 is a fragmentary elevation of a pear treating machine illustrating the manner in which the present invention is attached.
Figure 13 is a transverse sectional view of a coring instrumentality taken at the line 13—13 in Figure 1.

In Figure 1 two upright members 20 and 21 are shown. These members are two of four symmetrically arranged upright members comprising the frame of a pear treating machine of which the present invention is a part.

Disposed within the frame of the pear treating machine is a turret 22 disposed for intermittent rotative movement within a horizontal plane about the vertical axis in a support 23. In the present invention any suitable type of fruit holder for holding a half fruit by substantially embracing the curved surfaces of the fruit more or less, leaving the cut half face of the fruit exposed, preferably uppermost, may be utilized. In the present instance I have described and claimed specifically the utilization of cup-shaped fruit holders for holding the half fruit. Manifestly the broad features of my invention are not so limited to cups. Fruit cups 24 are carried about the periphery of the turret 22 in pairs, the pairs being quadrantly arranged about the periphery of the turret. Intermittent motion is imparted to the turret 22 by means of a Geneva cam mechanism (not shown). Such cam which rotates the turret ninety degrees with each movement to successively deliver a pair of fruit cups to the station between the upright frame members 20 and 21.

Figures 2, 12:
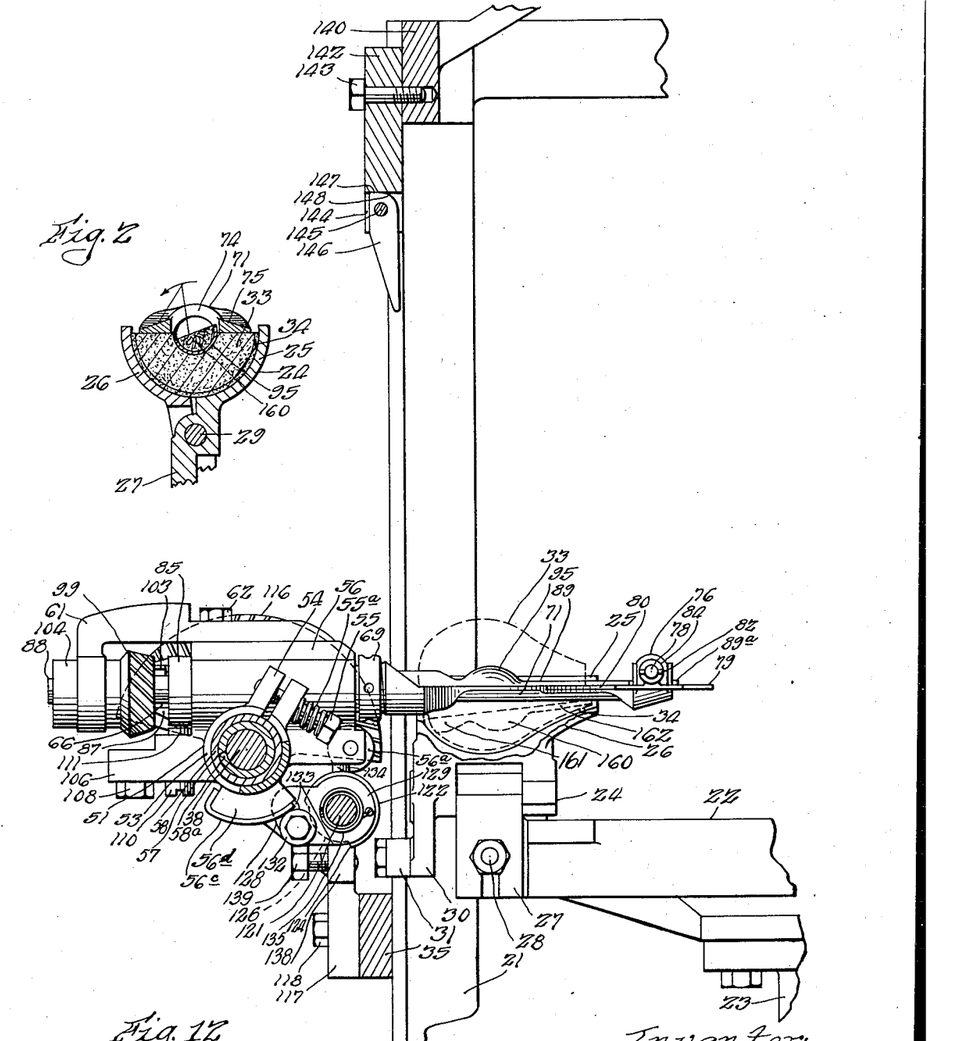
Figure 2 is a sectional view of a fruit cup.
Figure 12 is a sectional view of the device taken similarly to the view in Figure 10 and at a different stage in the operation of the device.

The fruit cups 24 comprise two complemental members 25 and 26. The member 25 embodies a stem 27 which is secured to the turret 22 stationarily by a bolt 28. The member 26 is pinned to the member 25 by means of a stud shaft 29 and has depending therefrom a short arm 30 carrying a roller bearing 31.

When the cups 25 arrive at the coring station which is at the side of the pear treating machine formed by the members 20 and 21, the cup elements 25 and 26 are spread apart. In each cup is a halved fruit 33 from which the peel 34 has previously been severed, the body of the fruit lying loosely in the peel, so that the fruit may be readily lifted from the cup independently of the peeling.

Extending between the frame members 20 and 21 is a bracket 35 secured in place to the two frame members by means of bolts 36. In opposite ends of the brackets 35 are alined bearings 37 in which is journalled a shaft 38. The bearings 37 comprise pillow blocks 39 and 40, the former being integral of the bracket 35. Bolts 41 serve as a means for holding the two pillow blocks together.

Adjacent to the bearing 37 on the frame member 21 and upon the shaft 38 is placed a collar 42 held in position by means of a set screw 43.

Upon the right end of the shaft 38, Figure 1, is a bevelled gear 44 which may be keyed to the shaft 38 to rotate therewith. The collar 42 and the gear 44 serve as thrust members against the contiguous sides of their respective bearings to prevent a longitudinal displacement of the shaft 38. Meshing with the bevelled gear 44 is a bevelled gear 45 which is upon a shaft 46 which is arranged normally to the shaft 38 and journalled within bearing brackets 47. Only one of the brackets 47 is shown, that shown being secured to the upright member 20.

Figure 3:
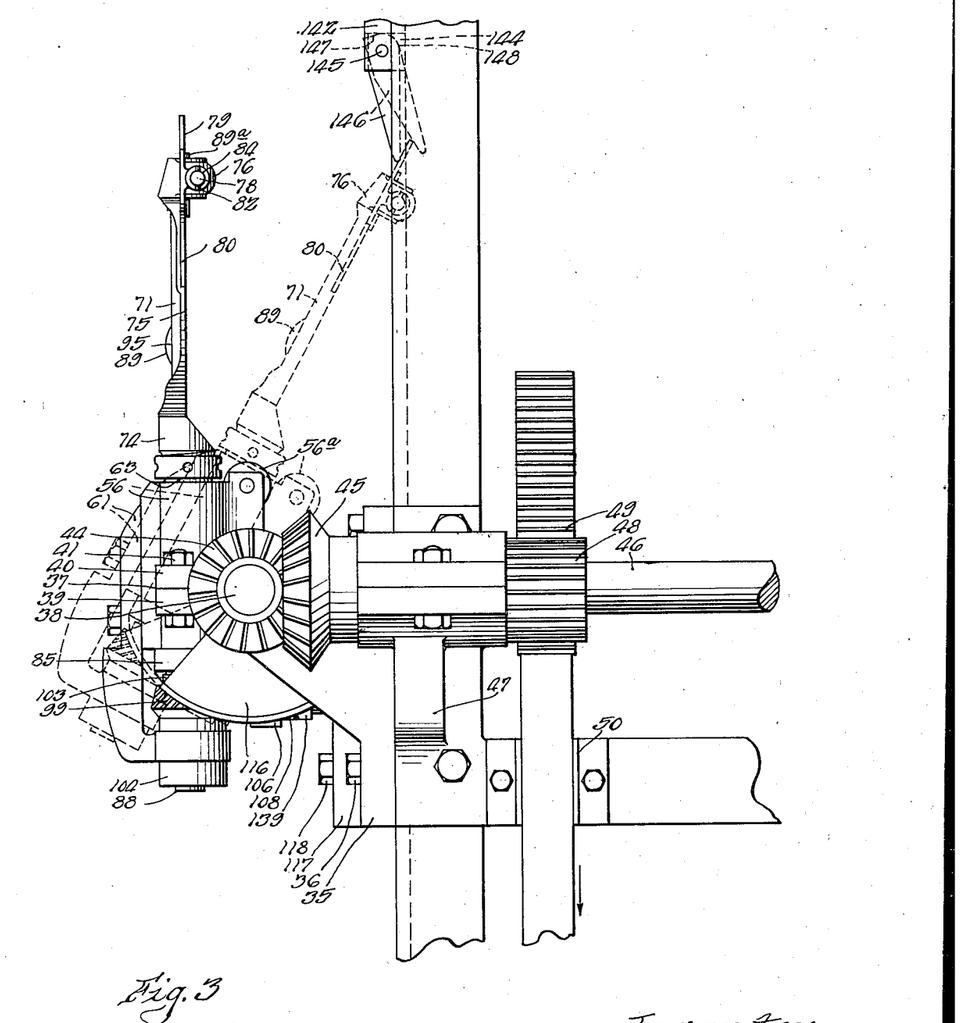
Figure 3 is an end view of the present invention.

Keyed to the shaft 46 is a pinion 48 for meshing with a rack 49. The rack 49 vertically reciprocates to oscillate reversely the shaft 46 and likewise the shaft 38 through the agency of the pinions 44 and 45. In Figures 1 and 3 there is shown a guide member 50 for holding the rack 49 in alinement with the pinion 48.

Substantially at the mid-section of the shaft 38 a sleeve 51 rotating therewith is attached by means of a set screw 52. At either end of the sleeve 51 are split collars 53 having ears 54 projecting therefrom in opposed relationship and suitably apertured for receiving bolts 55 so that the ears 54 may be drawn together to decrease the diameter of the collars 53. Collars 53 have an internal diameter greater than the internal diameter of the sleeve 51, of which they are a part, and do not contact the shaft 38.

Rotatively placed upon the shaft 38 beyond the ends of each of the sleeves 53, is a compound bearing block 56. The bearing block 56 has therein a bearing 57. Therein is an integral collar 58, extending between the sleeves 53 and a bronze bushing 58a upon the shaft 38. By tightening the sleeves 53 upon the collars 58, the friction of the bearing blocks 56 upon the shaft 38 may be increased. Arranged normally to the bearings 57 within the bearing blocks 56 are bearings 59. Each bearing 59 is supplemented by bearing 60 which is borne by a strap member 61 depending from the body of the bearing block 56 by means of screws or bolts 62.

Disposed within each bearing 59 for oscillation is a sleeve 63. About a central portion of the exterior of the sleeves 63 are chamfered grooves 64 to assist in the lubrication of those members within the bearings 59. Since the construction and assembly of the parts affiliated with the bearing blocks 56 are identical, a detailed description of those parts will be directed particularly to the single construction illustrated in Figure 4. Communicating from the groove 64 to the interior of the sleeve 63 is an aperture 65 through which the lubricant may be forced. At the left end of the sleeve 63, Figure 4, there is a lug 66.

Figures 4, 5, 6, 9:
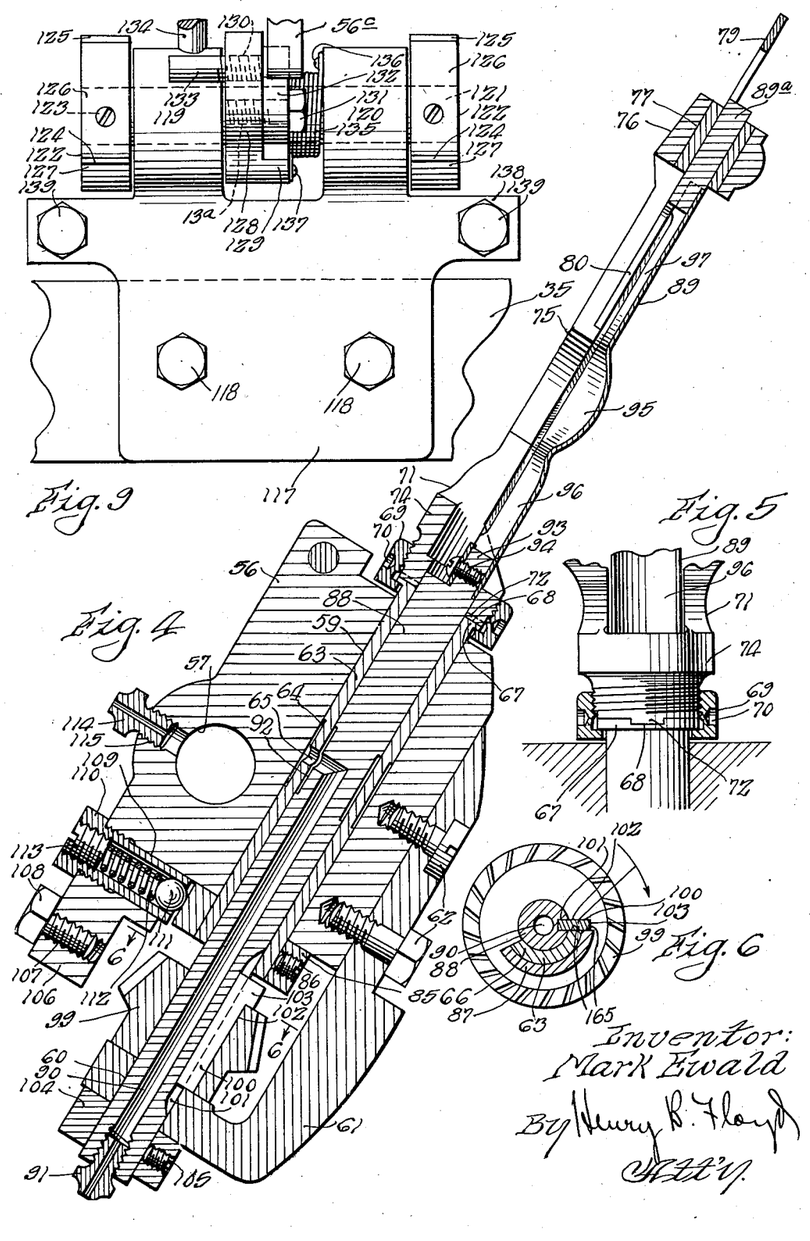
Figure 4 is an enlarged sectional view of a coring instrumentality showing details of construction.
Figure 5 is a fragmentary sectional view of parts of the device shown in Figure 4.
Figure 6 is a view taken in cross section along the line 6—6 of Figure 4.
Figure 9 is an orthographic projection of an element of the present invention.

At the right end of the sleeve 63, as will be noted in Figures 4 and 5, is a flange 67 having a radial slot 68. Carried upon the flanged end of the sleeve 63 is a running nut 69 having countersunk portions 70 therein.

Attached to the flanged end of the sleeve 63 to rotate therewith is a fruit contacting and/or turning mechanism, specifically herein illustrated as a coring paddle 71. The shank of the paddle 71 which abuts against the flange 67 is threaded so that it may be engaged by the running nut 69 for holding it in the assembled position with the sleeve. Projecting from the end of the paddle 71 are two diametrically arranged bosses 72 for seating within the groove or slot 68 within the flange 67 to assure the rotation of the paddle with the sleeve 63. Extending forwardly from the shank 74 of either of the coring paddles 71 are symetrically arranged members 75 to terminate within a journal block 76 which may be cast integral therewith. The members 75 are preferably flat, the composite contour of the two members being similar to that of the flat face of a pear severed centrally and longitudinally.

At opposite sides of the bearing block 76 which contains a bearing 77 are anchored pins 78. The pins 78 may be threaded into previously drilled and tapped recesses within the body of the bearing block 76. Commonly journalled upon the pins 76 is a flat flipper member 79 provided with fingers 80.

A section of the front face of the opposed members 75 is cut away to allow for the seating of the fingers 80 therein so that they will lie flush with the front face of said members. Bearings 81 depend from the flipper members 79 for engaging the pins 78. Cotter pins 82 are inserted within the outer ends of the pins 78 through apertures within such pins. Hooked to the cotter keys 82 by an end are coiled tortional springs 83. The opposite end of springs 83 are attached to the flipper member 79. The springs 83 are for constantly urging the fingers 80 into their seated position within the face of the coring paddle. There may be washers 84 inserted between the cotter keys 82 and the springs 83 to insure that such springs will not slide from the ends of the pins 78.

A collar 85 is secured to the left end of the sleeve 63, Figure 4, by means of a set screw 86. Projecting to the left from the collar 85 is a lug 87 which is coextensive arcuately with the lug 66 upon the end of the sleeve 63, as is illustrated in Figure 6. Disposed within the sleeve 63 in a rotative manner is a spindle 88 for cutting means for cutting free the central seed containing portion of the half fruit, which means is herein specifically illustrated as a coring spoon 89. The spindle 88 has a channel 90 reaching from an end thereof to a position opposite to the aperture 65 within the sleeve 63. Within the end of the spindle 88 is secured a grease plug 91 to which attachment may be had by a grease gun for forcing grease through the channel 90 and through the aperture 65 for lubricating the bearing 59. The channel 90 opens to the side of the spindle 88 at a point where there is cut a groove 92 which circumscribes the spindle. The groove 92 receives grease in the identical manner as does the groove 64 for lubricating the frictional surfaces between the sleeve 63 and the spindle 88.

Projecting from the right end of the spindle 88, Figure 4, is a lug 93 to accommodate the attachment of the coring spoon 89. A set screw 94 is employed for making the attachment between the two members. The extended end of the spoon 89 carries cylindrical piece 89a which is journalled in the bearing 77 at the end of the coring paddle 71. It will be noted in Figures 7 and 8 that the coring spoon 89 is curved in cross section and that either edge of the member 89 is sharpened. The center section of the spoon is enlarged at 95 which section coincides with the core of a fruit to be engaged by the coring instrumentality. Sections 96 and 97 on either side of the enlarged section 95 are for cutting the threads within the fruit which extend from the core to the blossom end and from the core to the stem bearing end of the fruit respectively.

It is clear that the cutting mechanism for removing the central seed containing section of the half fruit is not to be limited to the details of construction herein shown, as any type of cutting mechanism for accomplishing the functions set forth may be utilized. In the present instance, where the cutting mechanism is adopted to core pears, I prefer to have such cutting mechanism formed as a coring spoon and preferably of the construction illustrated.

Between bearing 60 and the bearing provided within the sleeve 63 and upon the spindle 88 is secured a pinion 99 in a non-rotative manner by means of a key 100. The key 100 slides commonly into a slot 101 cut longitudinally within the spindle 88 and a slot 102 in registry therewith and cut within the pinion 99. Key 100 projects beyond the pinion 99 to coact with the lugs 66 and 87 for turning the sleeve 63 in a manner later to be described. Movement of the pinion 99 axially of the spindle 88 is prevented by the bracket 61 and the extended ends of the lugs 66 and 87. Axial movement of the sleeve 63 and the spindle 88 is prevented by the coaction of the running nut 69 and a collar 104 which is attached to the left end of the spindle 88 by means of a set screw 105.

A section 106 of the bearing block 56 is apertured and tapped at 107 to receive a bolt 108. The bolt 108 is for limiting the rotative movement of the bearing block 56 about the shaft 38. In juxtaposition to the threaded aperture 107 is an aperture 109 which contains a threaded sleeve 110. The sleeve 110 is placed radially to the collar 85 and reaches very nearly to such collar. A ball 111, not unlike an ordinary ball bearing, is dropped into the sleeve 110 to be yieldingly pressed against the collar 85 by means of an expansion spring 112, the spring being compressed by means of a set screw 113 advanced into the outer and threaded end of the sleeve 110.

Means for lubricating the bearing 57 is provided by a plug 114 which is screwed into an aperture 115 leading to the bearing.

Fixed to the shaft 38 on the outer sides of the bearing blocks 56 are bevelled 116 for engaging the pinions 99. The pinions 99 are revolved by the bevelled gears 116 when the latter are turned by the shaft 38 concurrent to a stationary position being maintained by the bearing blocks 56.

Figures 7, 8, 10, 11:
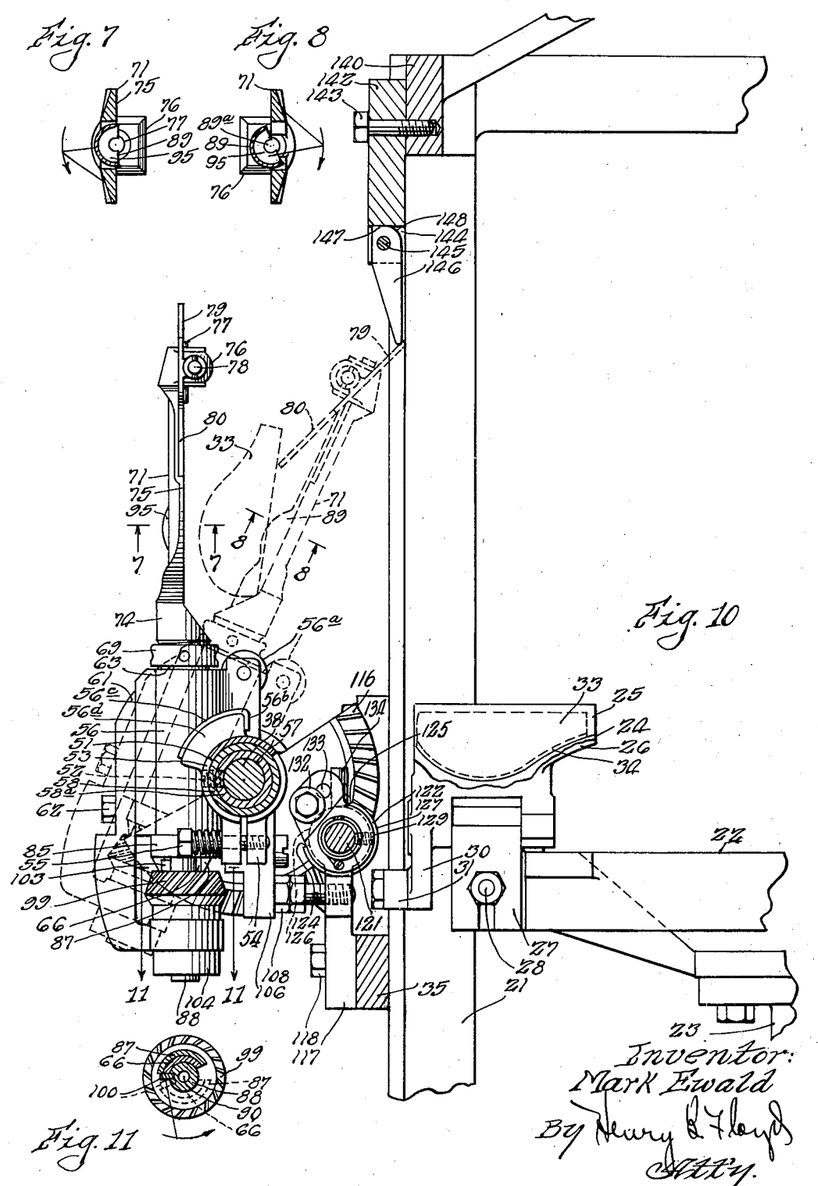
Figure 7 is a view taken in cross section of a coring paddle and coring spoon taken at the line 7—7 of Figure 10.
Figure 8 is a view similar to Figure 7 showing the coring spoon and coring paddle at a different stage in the operation of the device, and taken as indicated by the line 8—8 of Figure 10.
Figure 10 is a sectional view of the present invention taken laterally thereto.
Figure 11 is a sectional view of the device taken at the line 11—11 in Figure 10.

Intermediate the two ends of the bracket 35 is attached a smaller bracket 117 by means of bolts 118. The bracket 117 is shown in elevation in Figure 9 and a central view thereof is shown in Figure 10. Two bearings, 119 and 120, are embodied in the upper structure of the bracket 117 and commonly carry a short shaft 121. Carried upon the ends of the shaft 121 are similar circular cams 122. Set screws 123 extend through the cams to engage the shaft 121 to cause the cams to rotate in concert therewith. Within the periphery of each of the cams 122 is a sharp shoulder 124 and section 125 of increasing radius. A low arcuate section 126 connects the shoulders 124 and 125 on one side of the cam while the opposite side of the cam configures a longer arcuate section 127 of greater radius than the first named arcuate section. Set upon the shaft 121 between the bearings 119 and 120 is an arm 128, the shank 129 thereof engaging the shaft. Within the arm 128 are two apertures 130 and 130a, there being a bolt 131 in the aperture 130a to serve as a journal for a roller bearing 132. A pin 133 is set within the aperture 130 to project from the left face of the arm 128 for striking against a pin 134 which is anchored within the bearing member 119 and during certain periods in the operation of the device. Besides the arm 128 being upon the shaft 121 there is a spring 135 which is coiled about the shaft to have one end fastened to the bearing 120 by means of a screw 136 and the opposite end thereof secured to the arm 129 by means of a screw 137. The spring 135 at all times urges the arm 128 to rotate in a direction to carry the pin 133 against the pin 134. Rotation of the arm 128 by the spring 135 causes the shaft 121 and the cams 122 to rotate in the same direction.

Projecting from either side of the bracket 117 are lugs 138 in which there are threaded apertures for the reception of bolts 139. The bolts 139 are for abutting against the bolts 108 to stop the rotative movement of the bearing blocks 56 about the shaft 38 as is illustrated in Figure 10. One limit of rotation of a bearing block 56 about the shaft 38 may be varied by changing the distance which the head of the bolt 139 projects outwardly from the bracket 117.

Depending from a cross member 140 which extends between the frame upright members 20 and 21, is a block 142 which is secured to the cross member 140 by means of bolts 143. A slot 144 in the lower end of the block 144 carries therein, by means of a pin 145, anchored at either side thereof, a sprag 146. A shoulder 147 of the sprag precludes clockwise movement of that member beyond a vertical position by striking against the bottom of the slot 144. An arcuate section 148 upon the member 146 passes beneath the bottom of the slot 144 to permit its turning in an anti-clockwise direction.

Operation

When an impulse has been given to the turret 22 to deliver the fruit cups to the coring station, and where the cups are allowed to remain momentarily, the rack 49 is moved downwardly by means of a cam mechanism (not shown) to cause the shafts 46 and 38 to rotate and to cause the latter named shaft to rotate in a clockwise direction as viewed from the end supported by the frame member 20. Hereinafter the direction of rotation of the shaft 38 and the appendages thereto will be taken with reference from the right end, Figure 1. The coring paddle 71 and the coring spoon 89 are moved from the position shown in Figure 14 in a clockwise direction toward the cups 24, which are at the coring station.

Figures 14, 15, 16, 17, 18, 20:
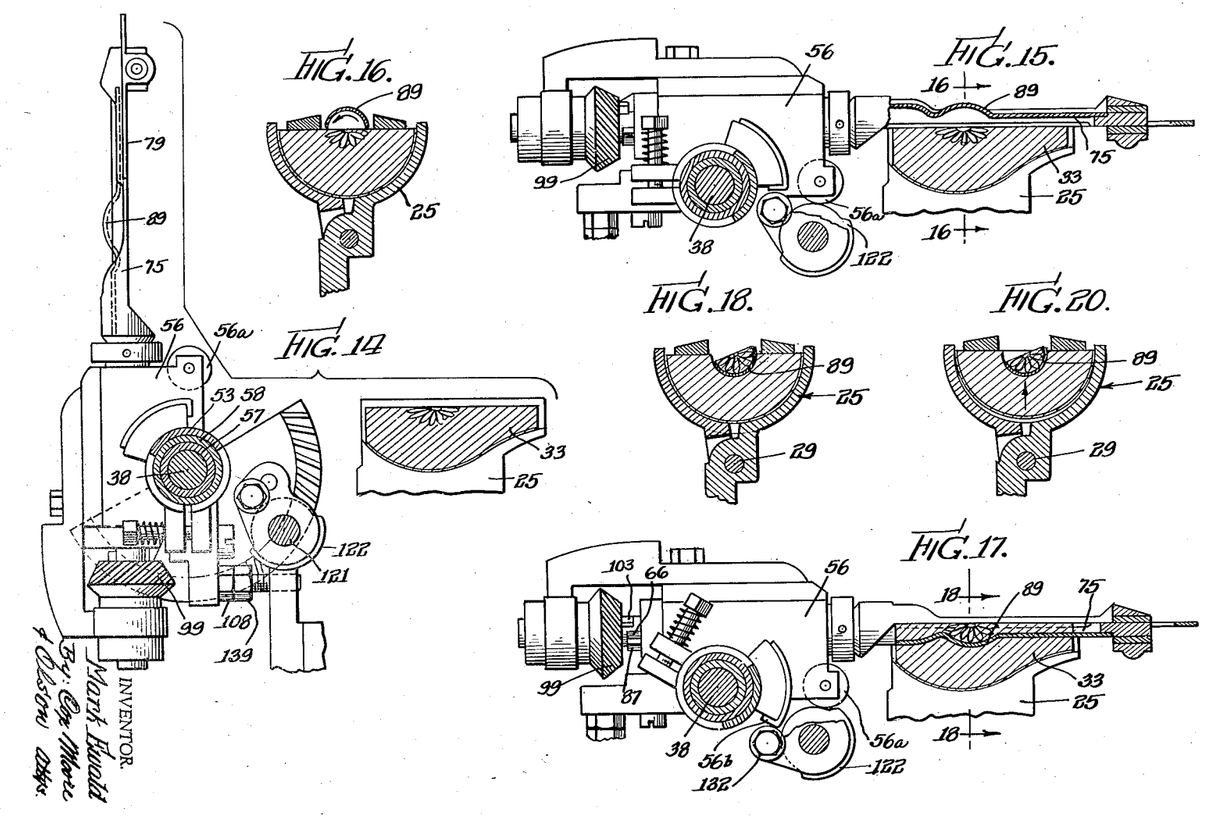
Figures 14 to 24 inclusive are diagrammatic views illustrating the operation of the device, Figures 16, 18, 20 and 22 being fragmentary sections taken along the lines 16—16, 18—18, 20—20 and 22—22 of Figures 15, 17, 19 and 21 respectively, and Figure 23 being a view similar to Figure 22, but with parts in a subsequent position of operation.

The paddles when approaching the fruit cups are arranged in the position illustrated in Figures 10 and 14. That is, the flat side of the paddles in which the fingers 80 are seated are turned toward the fruit 33 within the fruit cups. Also at this time the spoon 89, as will be noted in Figure 10, is turned with its opposite longitudinal edges alined with the front face of the paddle and with the heel thereof turned backwardly or to the left.

Since both of the coring paddles and spoons are identical in construction and operation, the following description of operation will be taken with reference to the instrumentality at the left in Figure 1 in order to simplify the description. It will be observed that the operation of the two members differs only in that the direction of rotation within the bearings 59 will be opposite.

Simultaneously with the positioning of the face of the paddle 71 upon the flat face of the half fruit 33, as shown in Figure 15, the roller 56a is carried against the lowest section 126 of the cam 122 upon the left end of the shaft 121, Figure 9. It will be recalled that the movement of the bearing block 56 with the shaft 38 is caused by the friction of the collar 58 with the split collar 53 which is fastened to the shaft 38 to rotate therewith.

As soon as the roller 56a comes in contact with the cam 122, further rotation of the bearing block 56 is precluded. However, the shaft 38 and the bevelled gear 116 continue to turn in a clockwise direction. The sleeve 51, since it is secured to the shaft 38, turns therewith to carry the inturned end 56b of the strip 56c against the roller 132. Continued movement of the sleeve 51 with the shaft 32 displaces the arm 128 and hence causes the shaft 121 to rotate in a counter-clockwise direction within the bearings 119 and 120.

Figure 19:
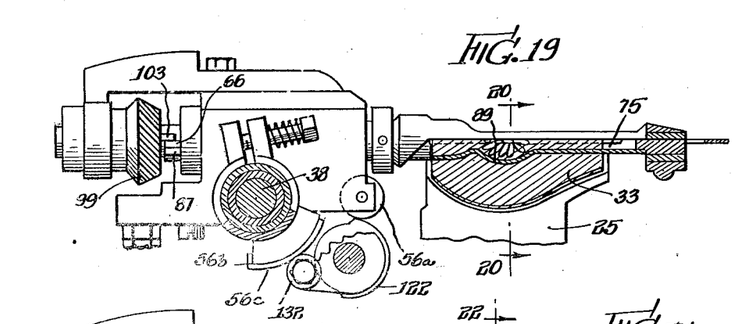

The cam 122 rotates with the shaft 121 to carry the face 125 thereof beneath the roller 56a and to present the roller upon the camming surface 127. The camming surface 127 being at a greater radius than the section 126 causes the bearing block 56 to rotate slightly counter-clockwise about the shaft 38 and to lift the face of the coring paddle 71 slightly from the fruit cup 24 as shown in Figures 19 and 20.

While the roller 56a is still upon the camming surface 126 and hence while the face of the coring paddle 71 is pressed flatly against the fruit 33, the bevelled gear 116 is causing the pinion 99 to revolve in a counter-clockwise direction with reference from the end of the spindle 88 which supports the coring spoon 89. It is thus that the coring spoon 89 is caused to revolve through an angle of two hundred and three degrees from the position shown in Figure 16 to the position shown in Figure 18 whereby to completely sever the core from the fruit. The angle of two hundred and three degrees is arbitrary and any angle sufficiently greater than one hundred eighty degrees will suffice. After the spoon 89 has turned through the above mentioned angle, it will have severed the core from the fruit and will be in such a position as illustrated in Figures 2, 8 and 18.

Figures 21, 22, 23:
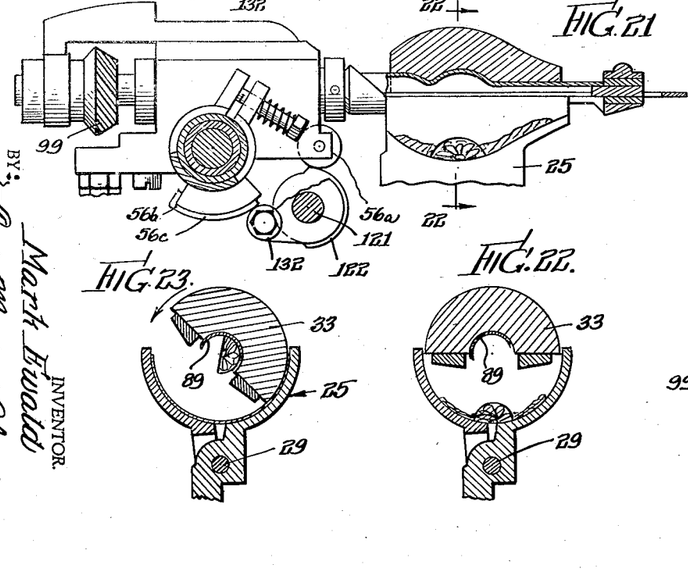

At the time that the paddle meets the fruit 33, the spindle 88 and the lug 103 on the key 102 are revolved to the position as shown in Figure 11. The ball bearing 111 bears upon the collar 85 to prevent the sleeve 63 from turning with the spindle 88 excepting when the sleeve is engaged to the spindle and to the pinion 99 by means of the lugs 87 and 100. While the lug 103 and the spindle 88 are turned with the pinion 99 through the above mentioned two hundred and three degrees, in a counter-clockwise direction as viewed in Figure 11, and to bring the coring spoon into the position as shown in Figure 2, the lugs 66 and 87 remain stationary. The sleeve 63 in addition to being held against rotation with the spindle 88, by the ball bearing 111, is also held stationary, that is, against revolving, by the pressing of the coring paddle against the flat face of the fruit. After the spoon has reached the position shown in Figure 2, the lug 100 will have revolved in a counter-clockwise direction, Figure 11, to the position at the opposite side of the lugs 66 and 87 as shown in Figures 13 and 19. Continued movement of the shaft 38 and hence of the bevelled gear 116 then causes the pinion 99 and the lug 100 to continue to turn in a counter-clockwise direction, Figure 13, to revolve the paddle 71 with the coring spoon 89 as illustrated in Figures 22 and 23.

The rack 49 is disposed to move downwardly far enough to cause the common revolution of the coring spoon and coring paddle in the counter-clockwise direction, Figure 2, through an angle of one hundred eighty degrees. After the one hundred eighty degree movement of the coring spoon and coring paddle in concert, the position will be assumed by the two members as shown in Figures 12, 21 and 22. The turning of the coring paddle through one the hundred eighty degrees skews the halved fruit which has been peeled from the fruit cup therebeneath and inverts it upon the then upper side of the paddle. Concurrent to this one hundred eighty degree movement of the paddle 71 and coring spoon, the core 160 of the fruit, which has previously been severed therefrom by the operation of the coring spoon, is allowed to drop from the concavity of the spoon thrugh the opening 74 of the paddle into the peeling cup in the manner shown in Figures 12, 21, 22 and 23.

In Figure 12, the general shape of the core cut taken by the coring spoon is illustrated. It will be noted that the core proper 160 is removed by the section 95 of the coring spoon while the threads 161 and 162 extending from the core 160 toward the blossom and stem end of the fruit, are effectively removed by the sections 96 and 97 of the coring spoon.

Concurrent to the turning of the coring spoon through the heretofore mentioned two hundred and three degree angle, and before the coring paddle is caused to turn, the roller 56a is being rolled along the camming surface 126 of the cam 122 so that the coring paddle is allowed to remain flatly against the severed face of the pear and so that the coring spoon is caused to take a sufficiently deep cut within the fruit to sever the core therefrom.

Friction between the split sleeve 53 and the collar 58 causes the paddle to be pressed firmly against the severed face of the fruit. Incident to the two hundred and three degree movement of the coring spoon, the boss 56d has displaced the arm 128 sufficiently to have caused the camming surface 125 to have transversed the roller 56a to lift the coring paddle slightly from the fruit cup as shown in Figures 19 and 20. Continued turning of the shaft 38 and hence the lug 56d causes the continued turning of the shaft 121 to carry the camming surface 127 of the cam 122 beneath the roller 56a to maintain the coring paddle in its slightly elevated position from the fruit cup and during the one hundred eighty degree revolution of the coring paddle.

While the roller 56a is engaging the camming surface 127, the roller 132 is passing along the strip 56c and reaches a position as shown in Figure 12 at the time the one hundred eighty degree movement of the coring paddle is completed.

It is desired to elevate the coring paddle slightly from the fruit cup 24 while the fruit is being rotated in the cup by the coring paddle so that there will be no injury caused to the fruit by the pressing thereof between the coring paddle and the walls of the cup. The vacuum between the flat face of the coring paddle and the severed face of the fruit which is assisted by the stickiness and viscosity of the fruit juice maintains the engagement of the fruit to the coring paddle while it is lifted from the cup and while the paddle is being rotated to place the fruit on the upper side thereof.

Figure 24:
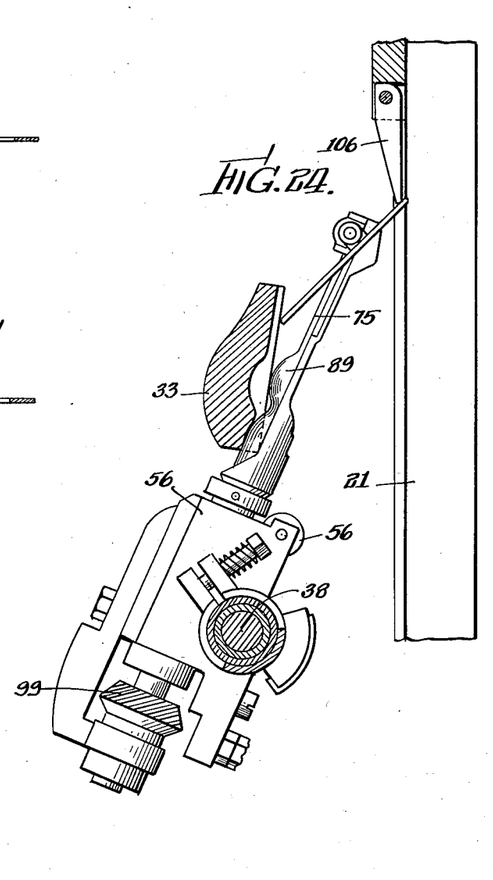

The fruit having had the core removed therefrom and being in the position shown in Figures 12 and 21, the rack 49 starts an upward movement to cause the shaft 38 and hence the bearing block and coring paddle, through the frictional engagement of the collar 58 with the sleeve 53, to turn in a counter-clockwise direction. When the shaft 38 has been rotated and the coring paddle have been revolved to the position shown in Figure 24, the flipper member 79 comes in contact with the lower extremity of the sprag 146 to cause a turning of that member 79 to remove the fingers 80 from their seat within the paddle to knock the fruit from the paddle.

The fruit 33 thus knocked from the paddle falls into any desired conveyor, as flowing water or brine, or on to a moving belt, to be carried elsewhere for further treatment.

After the fruit 33 has been displaced by the coring paddle, the shaft 38 continues to turn in a counter-clockwise direction to carry the coring paddle 71 into the position as shown in Figure 10. Further counter-clockwise movement of the bearing block 56 and hence the coring paddle 71 is prevented by the head of the bolt 108 striking the bolt 139. Continued movement of the shaft 38 and the bevelled gear 116 after the counter-clockwise movement of the bearing block 56 has been stopped by abutment of the bolts 108 and 138 causes a turning of the pinion 99 in a clockwise direction as viewed from above in Figure 10 and to revolve the spindle and the coring blade 89 which are connected directly thereto by means of the key 102 in the same direction.

Before the clockwise movement of the pinion 99 as above described, the lug 103 is commonly against the two lugs 66 and 87 as shown in dotted outline in Figure 11. Movement of the pinion and hence the coring spoon through two hundred and three degrees in the aforesaid clockwise direction will carry the lug 103 against the opposite sides of the lugs 66 and 87 as is the lug 103 shown in Figure 6. After the lug 103 has been carried against the sides marked 165 of the lugs 66 and 67, the lug 103 is caused to revolve through one hundred and eighty degrees additional and to turn the coring paddle therewith. The first two hundred and three degree movement of the coring spoon moves it relative to the coring paddle associated therewith and to position it with such paddle as in the arrangement shown in Figure 8.

At this time the coring paddle will be in the position shown in Figure 1, that is, with the face which engages the fruit turned away from the fruit, and hence the subsequent one hundred eighty degree movement of the coring paddle and spoon together arranges the coring paddle in the position as shown in Figures 7 and 14 to engage the fruit upon a subsequent clockwise movement of the shaft 38. After the two hundred and three degree movement of the spoon and the one hundred eighty degree movement of the spoon and coring paddle together subsequent to having dumped the fruit, the spoon and paddle will be in the position indicated in Figures 3 and 14.

From the foregoing it is deduced that the shaft 38 turns within an arc sufficient to revolve the coring paddle and the coring spoon therewith through an angle approaching ninety degrees and in addition sufficiently to cause a turning of the coring spoon through an angle of approximately two hundred and three degrees and then to turn the coring spoon an additional one hundred eighty degrees along with the coring paddle.

Subsequent to the arrangement of the coring paddle and coring spoon in the position shown in Figure 11, the rack 49 is given a downward movement to turn the shaft 38 and hence the bearing block 59 and the coring paddle 71 therewith in a clockwise direction and to begin the cycle of coring a fruit in the manner above described.

It will be noted in Figure 3 that the sprag 146 is allowed to turn upon the pin 145 in the direction in which it is propelled by the end of the flipper member 79 upon the retrogressive movement to engage a succeeding fruit at the coring station.

While the fruit which is being cored is being lifted from the fruit cup to be dumped outwardly of the machine the boss 56d is being turned in a counter-clockwise direction along with the shaft 38 and to allow the shaft 121 to be revolved in a clockwise direction under the impetus of the spring 135. The clockwise movement of the shaft 121 is limited by the striking of the pin 134 by the pin 133. In this manner the cams 122 are replaced to a position where the rollers 56a will strike the camming surfaces 126 when the succeeding fruit is engaged by the device.

The pressure applied to the fruit 33 while it is being operated upon by the coring spoon and by the coring paddle is determined by the amount of friction between the split sleeves 53 and the collars 58. The greater the amount of friction between the two members, the greater will be the tendency for the bearing block 56 to turn in the clockwise direction with the shaft 38 and hence the greater will be the pressure exerted by the coring paddle upon the fruit. This friction may be changed by adjusting the bolts 55. By turning the bolts 55 to bring the ears 54 closer together, the friction between the collars 58 and the sleeves 53 will be increased. The springs 55d between the heads of the bolts 55 and the ears 54 adjacent thereto cushion the frictional engagement between the sleeves and the collars.

After the fruit 33 has been cored and the core dropped therefrom into the cup from which the fruit has been lifted, the turret 22 is given a movement to remove that cup from the coring station to a station where there is other mechanism associated with the fruit treating machine for scavenging the cup of the peel and the core. Simultaneously with the removal of the cup to the position for having the peel and core removed therefrom, the succeeding cups loaded with different fruit to have the core removed therefrom are delivered to the coring station.

It is understood that the term "pad," or "paddle," comprehends or includes any type of suitably shaped means for contacting the flat cut face of the half fruit while the same is in the fruit holding means, and for contacting the fruit on opposite sides of the zone to be cut, or from which the central seed containing section is to be removed, and preferably in such a manner as to prevent the half fruit from turning during the cutting operation, and preferably wherein such fruit contacting means may be lifted to relieve the fruit from the walls of the fruit holder and is thereafter shifted bodily to turn the half fruit about substantially the axis of turning of the cutting mechanism.

What is claimed as new and is desired to be secured by Letters Patent of the United States is:

1. In combination, a coring device comprising a coring spoon, a coring paddle, a shaft disposed for oscillation and for carrying said spoon and paddle to oscillate therewith in a non-positive manner, a movable stop interposed in the path of movement of said spoon and paddle, means movable with said shaft to revolve said paddle and said spoon about an axis normal to the axis in said shaft incident to the stopping of said spoon and paddle by said stop, and means for moving said stop to displace said spoon and paddle about said shaft.

2. In a device for cutting half fruit, the combination of fruit holding means movable solely in a single plane and adapted to be positioned at a cutting station, a fruit cutting support shiftable solely in a plane substantially at right angles to the plane of movement of the holding means and toward and from the holding means when positioned at the cutting station, cutting means mounted on the cutting support and adapted to contact the cut face of a half fruit in one position of the cutting support, means for causing the cutting means to cut through the flesh of the half fruit when in contact therewith, complemental fruit holding means mounted on the cutting support and shiftable relatively to said support and to said cutting means, said complemental fruit holding means including mechanism serving to cause the complemental holding means to contact the cut face of the half fruit and hold the fruit from shifting about a horizontal axis during the cutting operation.

3. In combination, a coring device comprising a compound bearing block, a coring paddle, a sleeve for carrying said paddle and journalled in a bearing in said block, a coring spoon, a spindle for carrying said spoon and journalled in said sleeve, a pinion on said spindle, means turning with said pinion for causing said sleeve to turn therewith through a selected arc, a shaft journalled in a second bearing in said block normally to the first mentioned bearing, a beveled gear upon said shaft engaging said pinion for revolving the latter when said shaft rotates relative to said bearing block and means for holding said bearing block against rotation.

4. A coring device comprising a coring paddle, a coring spoon, concentrically arranged revoluble supports for said paddle and for said spoon, means for revolving one of said supports, and means for resisting the movement of the other of said supports therewith.

5. A coring device comprising a coring paddle, a coring spoon, concentric supports for said paddle and for said spoon, means for revolving one of said supports, means for effecting movement of the other of said supports therewith through a selected angle, and means for resisting movement of the second of said supports with the first.

6. A coring device comprising a bearing block, a coring paddle, a sleeve journalled in a bearing in said block for carrying said paddle, a spindle journalled in said sleeve, a coring spoon attached to said spindle for revolving therewith, means for revolving said spindle, and means for resisting the movement of said sleeve with said spindle.

7. A coring device comprising a bearing block, a coring paddle, a sleeve journalled in a bearing in said block for carrying said paddle, a spindle journalled in said sleeve, a coring spoon attached to said spindle for revolving therewith, means for revolving said spindle, means for revolving said sleeve through a selected angle with said spindle, and means resisting the movement of said sleeve with said spindle.

8. A coring device comprising a pad having a passage-way and engaging the flat surface of a half fruit, a coring spoon journalled in said passage-way, said coring spoon being normally disposed in said passage-way but revoluble thereout of and through a path about the core portion of such fruit, means, for revolving said spoon, and means for thereafter revolving said pad in the same direction as said spoon.

9. In a machine for treating a half fruit, a coring device comprising a pad having a face engaging the flat face of such fruit, a spoon normally retracted into said pad and movable thereout of about the core portion of such fruit, the axes of revolution of said pad and of said spoon being coincident, and means for causing intermittent successive revolutions of said pad and spoon.

10. A coring device comprising an invertible pad having a face containing a passage-way and engaging the flat face of a half fruit, means urging said pad against such fruit, a blade within said passage-way and journalled at opposite ends thereof, means for revolving the blade out of said passage-way, the movement of the blade severing the core section from the fruit, means for inverting said pad and engaged fruit subsequent to revolution of said blade, and means for displacing said pad oppositely to the direction of urge from said urging means and coincidentally with such inversion.

11. A coring device comprising a receptacle for a half fruit, a rotatable pad containing a passage-way and engaging the flat face of such fruit, means alternately urging said pad toward said receptacle and away from said receptacle, a blade in said passage-way and journalled at the ends thereof, means revolving said blade out of said passage-way to sever the core section from the fruit, means revolving said pad to discharge the fruit from the cup to the pad, and means for spacing said pad from the cup and holding said pad in such spaced position relative to the cup against the force of said urging means during the discharge of the fruit from the cup, said urging means reversing its application of force to move said pad and fruit from the cup subsequently to such discharge of the fruit.

12. In a fruit cutting device, the combination of a fruit turret intermittently shiftable in a horizontal plane only and having a plurality of spaced fruit holders, each holder having a holding surface adapted to contact the curved wall of the half fruit, said holding surface being fixed relatively to said holder, a cutting head shiftable toward and from each fruit holder, cutting means shiftably mounted on said cutter head, power means for shifting said cutter head toward and from each fruit holder when the latter are successively positioned at the cutting station and for moving the cutting means into contact with the cut face of the half fruit and through the flesh of the half fruit, and complemental fruit holder means carried by the cutter head and adapted automatically to engage the cut face of the half fruit and to remain in contact therewith during the cutting operation to prevent the cut face of said half fruit from tilting angularly with respect to the first mentioned holding means during the cutting.

13. A coring device comprising a revoluble pad engaging the flat surface of a half fruit, a coring spoon journalled within said pad, one side of the coring spoon having a cutting edge movable in a path external of said pad to sever the core from such fruit, means for imparting revoluble movement to said coring spoon, and means for revolving said pad in the same direction as said spoon, the revolving of said pad being upon an axis concentric with the axis of revolution of said spoon and in timed relation to that of said spoon.

14. In combination, a receptacle for holding a half fruit with its cut face exposed, a coring device having a rotatable blade retractible into said device, means for moving the coring device toward and into registry with the receptacle, means for rotating said blade when such registry has been obtained, and means for moving the coring device away from the receptacle in two steps, the first step to space the coring device from fruit in the receptacle and the second step to clear the cup of the coring device.

15. In a fruit treating device the combination of a cup for holding a half fruit with its cut face uppermost, fruit contacting means having spaced portions adapted to overlie and contact portions of the cut face of the fruit on opposite sides of the central zone thereof, an arcuate cutter adapted to lie in the space between said spaced apart portions and to move relatively thereto, means for turning the cutter in a predetermined direction one hundred eighty degrees or more to cut the central portion of the half fruit at the face thereof, and means for thereafter turning the fruit contacting means and the cutter about the axis of turning of the cutter approximately one hundred eighty degrees in the same direction.

16. In a fruit treating device the combination of a recessed fruit holder adapted to hold a half fruit with its cut face uppermost, means having spaced portions adapted to overlie and contact the cut face of the fruit, an arcuate cutting means turnably mounted to make a substantially semi-spherical cut in the cut face of the fruit between the portions of the cut face of the fruit contacted by said spaced portions, and means for turning said cutter to make said cut, means for causing the contacting means to engage the cut faces of the fruit during said cutting operation, means for slightly relieving the contacting means from pressure on the fruit after the completion of the cutting operation, and means for turning the contacting means and cutting means together about the axis of turning of the cutting means substantially one hundred eighty degrees to substantially invert the cut fruit and to discharge the cut portion into the fruit holder.

17. In a fruit treating device the combination of means for holding a half fruit with its cut face uppermost, fruit cutting means and fruit turning means each adapted to act upon the cut face of the fruit, said means being turnable about a substantially common axis lying substantially parallel to the plane of the cut face of the fruit, and means for turning the cutting means about said axis independently of the turning means to sever the central portion of the fruit and for thereafter moving the turning means about said axis to bodily shift the fruit in the holding means.

18. In a fruit treating device the combination of means for holding a half fruit with its cut face uppermost, fruit cutting means and fruit turning means each adapted to act upon the cut face of the fruit, said means being turnable about a substantially common axis lying substantially parallel to the plane of the cut face of the fruit, and means for turning the cutting means at least one hundred eighty degrees about its axis to sever the central section of the fruit and means for thereafter turning the turning means about said axis together with the cutting means substantially one hundred eighty degrees to invert the fruit.

19. In a pear coring device the combination of a cup shaped substantially to hold a half pear with its cut face uppermost, a fruit contacting paddle adapted to be moved to position overlying the cut face of the pear, said paddle having a longitudinal opening therethrough adapted to overlie the core and stem of the pear, a substantially semi-cylindrical coring spoon associated with said paddle and adapted to be mounted for turning in the paddle opening, means for positioning the paddle and coring spoon in overlying position with respect to the cut face of the pear, means for turning the coring spoon substantially two hundred three degrees to core the half pear, means for slightly raising the paddle from the cut face of the pear, means for turning the paddle and coring spoon together about an axis disposed parallel to the cut face of the pear substantially two hundred and three degrees whereby to invert the cored pear in the pear cup and to discharge the core into the cup.

20. In a fruit treating device the combination of a cup adapted to receive a half pear with its cut face uppermost, coring mechanism comprising a fruit contacting paddle having spaced portions adapted to contact the cut face of the pear on opposite sides of the stem axis of the pear, a coring spoon mounted for rotation in the space between the spaced portions of the paddle, means for moving the paddle and spoon to position the same in superposed relation to the cut face of the pear, means for operating the spoon for causing the same to core the pear, means for slightly raising the paddle from the cut face of the fruit and for turning the paddle substantially about the stem axis of the pear to substantially invert the pear, and means for moving the paddle and spoon from the face of the pear to discharge the cored pear from the cup.

21. In combination, a recessed holder for receiving a half fruit, fruit cutting means for removing the central seed containing portion of the fruit comprising a paddle having a flat face and including cutting means mounted for movement in and relatively to said paddle, means for advancing said paddle into pressing engagement with the flat face of the fruit in said fruit holding means, means for relieving the pressure upon the cut face of the fruit in said fruit holding means to reduce the pressure of the fruit upon the fruit holder, means for moving the cutting means through the fruit in the fruit holding means prior to reducing the pressure of the paddle upon the fruit, and means for revolving said paddle about an axis passing substantially through the face of the paddle after said cutting means has moved through such fruit.

22. In a fruit treating apparatus the combination of means for turnably supporting a half fruit with its cut face exposed, cutting means mounted arcuately to turn about an axis lying substantially centrally of and parallel to and adjacent the exposed cut face of the half fruit so supported, and mechanism for turning the cutting means about such axis and for turning the half fruit on substantially the same axis, said mechanism operating to turn the fruit and the cutting means in the same direction.

23. In a fruit treating device, the combination of means for supporting a half fruit with its cut face exposed, cutting means, means for moving the cutting means about an axis lying parallel to the plane of the cut face of the fruit and through an arc of more than 180 degrees and less than 360 degrees to remove the central seed containing section of the half fruit, and means for thereafter turning the fruit about an axis lying parallel to and substantially in the plane of the cut face of the fruit to invert the fruit.

24. In a fruit treating device, the combination of recessed means for holding a half fruit with its cut face exposed, a shaft adapted to rotate in alternating reverse directions, a carriage or bearing, releasable friction driving means for causing said carriage to move with said shaft toward and from the recessed fruit holder, stop means for holding the carriage from movement with said shaft during certain portions of the turning of said shaft, said friction means releasing to permit continued rotation of said shaft, a sleeve frictionally mounted on said carriage, fruit contacting means carried thereby, a shaft rotatably mounted within said sleeve, cutting means carried by said shaft, a driving gear carried by said first shaft, a second driving gear carried by said cutter carrying shaft, and adapted to be driven by said driving gear, means forming a lost motion driving connection between said second gear and said sleeve, and impositive releasable means for holding said sleeve from rotation relative to said carriage.

25. In a fruit treating device, the combination of recessed means for holding a half fruit with its cut face exposed, a shaft adapted to rotate in alternating reverse directions, a carriage or bearing, releasable friction driving means for causing said carriage to move with said shaft toward and from the recessed fruit holder, stop means for holding the carriage from movement with said shaft during certain portions of the turning of said shaft, said friction means releasing to permit continued rotation of said shaft, a sleeve frictionally mounted on said carriage, fruit contacting means carried thereby, a shaft rotatably mounted within said sleeve, cutting means carried by said shaft, a driving gear carried by said first shaft, a second driving gear carried by said cutter carrying shaft, and adapted to be driven by said driving gear, means forming a lost motion driving connection between said second gear and said sleeve, impositive releasable means for holding said sleeve from rotation relative to said carriage, and means operable on turning of said first mentioned shaft for shifting said carriage independently of said first mentioned carriage shifting mechanism to shift the first contacting means from the cut face of the fruit in the fruit holder at predetermined times.

26. A fruit treating apparatus comprising means forming a recessed fruit holding means for holding a half fruit with its cut face uppermost, means for contacting the cut face of the fruit to sever the central seed containing portion, including mechanism angularly to turn the half fruit bodily in and relatively to its holding means to a position wholly outside of said holding means while leaving the severed portion of the half fruit in said holding means.

27. A fruit treating apparatus comprising means forming a recessed fruit holding means for holding a half fruit with its cut face exposed, means having a flat surface adapted to contact the flat exposed surface of the half fruit while the fruit is so held, means for severing the central seed containing section of the half fruit while so held and so contacted, means for slightly shifting the flat contacting surface away from the holding means whereby to cause the half fruit adhering to said flat surface to be correspondingly shifted, and means for bodily turning the flat surfaced means relatively to the holding means on an axis substantially parallel to the cut face of the half fruit to discharge said half fruit from said holding means.

28. A coring device comprising a receptacle for a half fruit, means having a flat face for engaging the flat face of such fruit, means for revolving said fruit engaging means relatively to said receptacle to transfer the fruit from the receptacle onto the flat face of said engaging means, means for moving the fruit engaging means into registry with the receptacle with said engaging means and receptacle predeterminately spaced, and means for changing the spacing between said fruit engaging means and said receptacle anterior to the revolution of said fruit engaging means.

29. In combination, a receptacle for holding a half fruit with its cut face exposed, a coring device comprising a rotatable pad adapted to engage the flat face of such fruit, means for advancing the pad upon such fruit for contact therewith, means for revolving said pad, and means operable prior to the revolution of said pad for separating said pad a relatively slight distance from said receptacle after said pad has contacted the fruit therein.

30. A coring device comprising a revoluble pad engaging the flat surface of a half fruit, a coring spoon journalled within said pad and having an axis of revolution therein, the coring spoon being revoluble in a path externally of said pad to sever the core from such fruit, means imparting revolving movement to said spoon, and means operable following the revolving of said spoon for revolving said pad about the axis of said spoon.

31. In a machine for treating a half fruit, a coring device comprising a pad having a face engaging the flat face of such fruit, said pad having an opening therethrough, a spoon normally retracted into said pad and movable thereout of completely about the core portion of such fruit to remove such portion with a single movement, said pad and spoon being revoluble upon coincident axes, and means for first causing said spoon to revolve and thereafter causing simultaneous revolution of said spoon and pad in the same direction through a predetermined arc.

32. A coring device comprising a pad for engaging the flat face of a half fruit, a spoon normally retracted into said pad, said spoon being movable about an axis substantially within the plane face of such fruit to describe a path about the core portion thereof, said pad being revoluble concentrically of such axis, means for imparting a continuous revolving movement to said spoon, means for holding said pad stationary during the initial movement of said spoon, and means for subsequently releasing said pad for conjoint revolving movement with the spoon and in the same direction.

33. A coring device comprising a pad member for engaging the flat face of a half fruit and movable about an external axis, a blade retracted into said pad and movable therefrom about an axis substantially within the plane face of such fruit to describe a path about the core portion thereof, said pad being revoluble about an axis substantially within the face of such fruit, and a plurality of actuating means operating in synchronism to successively cause revolution of said blade while said pad is at rest, conjoint revolution of said blade and pad, and rotation of said pad about said external axis.

34. In combination, a frame, a receptacle in said frame for half fruit, a rotatable support on said frame, a coring device comprising a pad having a face engaging the flat face of the fruit in said receptacle and movable about the axis of said support, a spoon normally retracted into said pad and movable therefrom about the core portion of such fruit, said pad and spoon having coincident axes of revolution, means for causing intermittent successive revolution of said spoon and pad, and means for rotating said pad about the axis of said support in timed relation with the actuation of the intermittent revolving means for said pad and spoon.

35. A cutting mechanism for half fruit comprising means for supporting a half fruit with its cut face in predetermined position, cutting means mounted to turn on an axis lying substantially parallel to the cut face of the fruit, means for turning the cutting means to remove the central seed containing portion of the fruit, and means for thereafter substantially inverting the fruit relatively to its supporting means to discharge the cut portion from the half fruit.

36. In a device of the class described the combination of a fruit cup adapted to hold a half fruit with its cut face uppermost, fruit contacting means having spaced portions adapted to engage the cut face of the fruit, there being a space between said fruit contacting portions overlying the central axis of the fruit, an arcuate cutter mounted for turning in said space between spaced portions of the fruit contacting means, means for turning said cutter at least one hundred eighty degrees about an axis substantially parallel to and adjacent the plane of the cut face of the fruit at the central portion of the fruit, the spaced portions of the fruit contacting means firmly contacting the cut face of the fruit during the cutting operation, means for thereafter slightly relieving the fruit contacting means from pressure on the fruit and for turning the fruit contacting means about substantially the axis of turning of the cutter and for simultaneously turning the cutter approximately one hundred eighty degrees.

37. In a fruit treating device the combination of a fruit holder adapted to hold a half fruit with its cut face uppermost, cutting mechanism for the half fruit comprising fruit cutting means and fruit turning means adapted to turn about a substantially common axis, means for turning the cutting means at least one hundred eighty degrees while holding the turning means stationary whereby to cut the central seed containing portion of the fruit and means for thereafter moving the cutting means and turning means together substantially one hundred eighty degrees about an axis parallel to the cut face of the half fruit whereby to invert the fruit and to discharge the loose cut portion from the fruit.

38. In a pear coring device the combination of a cup shaped substantially to hold a half pear with its cut face uppermost, a fruit contacting means adapted to be moved to position overlying the cut face of the pear, said contacting means having a longitudinal opening therethrough adapted to overlie the core and stem of the pear, a substantially semi-cylindrical coring spoon associated with said fruit contacting means and adapted to be mounted for turning in the opening in the fruit contacting means, means for positioning the fruit contacting means and coring spoon in overlying position with respect to the cut face of the pear, means for turning the coring spoon at least one hundred eighty degrees to core the half pear, means for slightly raising the fruit contacting means from the cut face of the pear, means for turning the fruit contacting means and coring spoon together about an axis substantially parallel to the cut face of the pear substantially one hundred eighty degrees whereby to invert the cored pear in the pear cup and to discharge the core into the cup.

39. In an apparatus for treating half fruit, the combination of recessed means for holding half fruit with its cut face uppermost, means for cutting a section from the central portion of the fruit at the cut face, means engaging the cut open face of the half fruit for holding the half fruit firmly in said recessed means during the cutting operation, means for relieving the engaging means after the cutting operation, and means for turning the engaging means for turning the half fruit about an axis lying substantially parallel to the plane of the cut open face of the fruit for substantially inverting the fruit with respect to its recessed holding means.

40. In an apparatus for treating half fruit, the combination of recessed holding means for holding half fruit with its cut face uppermost, means for cutting a section from the central portion of the fruit at the cut face, means engaging the cut open face of the fruit for holding the fruit firmly in recessed means during the cutting operation, means for relieving the engaging means after the cutting operation, and means for turning the engaging means for bodily turning the half fruit while in the recessed holding means and relatively thereto preparatory to discharging the half fruit from said holding means.

41. In a fruit treating apparatus, the combination of means forming a fruit holder adapted to receive a half fruit therein with its plane face uppermost, combined seed severing and discharging mechanism for said fruit while in said holder comprising a rotatable shaft, seed severing mechanism carried thereby and adapted to be presented to the cut face of the fruit to sever the seed section from the same, a sleeve surrounding said shaft, a fruit contacting member carried by said sleeve and adapted to contact the flat face of the fruit and to turn the fruit for discharging same from the holder, means for reversely turning said shaft, a lost motion driving connection between said shaft and said sleeve, and means for frictionally holding said sleeve in predetermined positions.

42. In a fruit treating apparatus, the combination of a fruit holder adapted to receive a half fruit with the cut face uppermost, seed severing and fruit discharging mechanism therefor comprising a drive shaft, seed severing mechanism carried thereby adapted to be presented to the face of the fruit to sever the seed section from the same, means adapted to contact the face of the fruit to invert the same to discharge the fruit from the holder after the seed severing operation, means for reversely turning the shaft, means actuated by the shaft during a portion of the angular movement of the shaft for positively turning the fruit contacting means with the shaft and for permitting the shaft to turn independently of the fruit contacting means during another angular movement of the shaft, and means for holding the fruit contacting means from turning when said fruit contacting means is not driven by said shaft.

43. In a fruit treating apparatus, the combination of a fruit holder adapted to receive a half fruit with the cut face uppermost, seed severing and fruit contacting mechanism therefor comprising seed severing means adapted to overlie the fruit, a fruit contacting member adapted to contact the cut face of the fruit at one side of the seed severing means, and common means for positively turning said seed severing means and said fruit contacting member including mechanism for causing the turning of the seed severing means while frictionally holding the fruit contacting member in stationary position.

44. In combination, a machine having means for holding a halved fruit with its flat face exposed, a coring device comprising a revoluble member for engaging the flat face of such fruit, means for revolving said member to transfer such half fruit thereonto, means for displacing said revoluble member slightly from said fruit holding means prior to its actuation by said revolving means, and means for displacing said revoluble member a greater distance from said fruit holding means subsequent to the actuation of said revolving means.

MARK EWALD.

CERTIFICATE OF CORRECTION.

Patent No. 2,242,241.  May 20, 1941.

MARK EWALD.

It is hereby certified that error appears in the printed specification of the above numbered patent requiring correction as follows: Page 2, first column, line 63, for "paddle adhesion thereto to lift" read --paddle and by adhesion thereto lift--; page 3, second column, line 69, for the word "adopted" read --adapted--; page 4, first column, line 33, before "116" insert --gears--; page 5, first column, line 43, for "lug 103" read --lug 100--; line 74, for "one the" read --the one--; and that the said Letters Patent should be read with this correction therein that the same may conform to the record of the case in the Patent Office.

Signed and sealed this 22nd day of July, A. D. 1941.

(Seal)

Henry Van Arsdale,
Acting Commissioner of Patents.